US011214293B2

(12) United States Patent
Nishimura et al.

(10) Patent No.: US 11,214,293 B2
(45) Date of Patent: Jan. 4, 2022

(54) STEERING APPARATUS AND METHOD FOR CONTROLLING STEERING APPARATUS

(71) Applicant: JTEKT CORPORATION, Osaka (JP)

(72) Inventors: Yousuke Nishimura, Kariya (JP); Norihiro Ochi, Nara (JP); Takeshi Watanabe, Kashihara (JP); Yasuyuki Nozawa, Kashihara (JP); Kei Kitahara, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 211 days.

(21) Appl. No.: 16/573,740

(22) Filed: Sep. 17, 2019

(65) Prior Publication Data

US 2020/0101998 A1 Apr. 2, 2020

(30) Foreign Application Priority Data

Sep. 28, 2018 (JP) .............................. JP2018-183820

(51) Int. Cl.
*B62D 1/183* (2006.01)
*G06T 7/70* (2017.01)
(Continued)

(52) U.S. Cl.
CPC ........... *B62D 1/183* (2013.01); *B60N 2/0244* (2013.01); *B62D 1/187* (2013.01); *G06T 7/70* (2017.01); *G06T 2207/30268* (2013.01)

(58) Field of Classification Search
CPC ........ B62D 1/183; B62D 1/187; B62D 1/181; B62D 1/04; G06T 7/70; G06T 2207/30268; B60N 2/0244; B60N 2/06
(Continued)

(56) References Cited

U.S. PATENT DOCUMENTS 5,449,199 A * 9/1995 Heinrichs .............. B62D 1/184
280/775
6,390,505 B1 * 5/2002 Wilson .................. B62D 1/181
280/775
(Continued)

FOREIGN PATENT DOCUMENTS

EP 1283146 B1 * 6/2006 ............. B60R 21/09
FR 2 806 042 A1 9/2001
(Continued)

OTHER PUBLICATIONS

Feb. 12, 2020 Extended Search Report issued in European Patent Application No. 19198947.4.

*Primary Examiner* — Jonathan M Dager
*Assistant Examiner* — Jean W Charleston
(74) *Attorney, Agent, or Firm* — Oliff PLC

(57) ABSTRACT

A steering apparatus includes a steering wheel that rotates about a first rotation axis, a folding mechanism that folds the steering wheel along the first rotation axis, a moving mechanism that moves the steering wheel between a protruding position in which the steering wheel protrudes from a dashboard of the vehicle and a stored position closer to the dashboard than the protruding position, and an electronic control unit that drives the folding mechanism and the moving mechanism. When the folded steering wheel is moved from the protruding position to the stored position, the electronic control unit drives, in advance, a drive member mounted on the vehicle so that the steering wheel is retracted relative to a body of a driver.

11 Claims, 14 Drawing Sheets

(51) Int. Cl.
*B60N 2/02* (2006.01)
*B62D 1/187* (2006.01)

(58) Field of Classification Search
USPC .......................................................... 701/48
See application file for complete search history.

(56) References Cited

U.S. PATENT DOCUMENTS

| | | | | |
|---|---|---|---|---|
| 9,764,756 | B2* | 9/2017 | Sugioka | ................... B60N 2/06 |
| 2003/0122359 | A1* | 7/2003 | Pardonnet | .............. B62D 1/187 |
| | | | | 280/777 |
| 2013/0275010 | A1* | 10/2013 | Kouchi | .................. B62D 1/181 |
| | | | | 701/49 |
| 2017/0174203 | A1* | 6/2017 | Brown | .................. B60R 21/205 |
| 2017/0297606 | A1* | 10/2017 | Kim | ........................ B62D 1/181 |
| 2018/0370559 | A1* | 12/2018 | Swamidason | .......... B62D 1/181 |
| 2020/0043340 | A1* | 2/2020 | Agnew | ................ G05D 1/0055 |

FOREIGN PATENT DOCUMENTS

| | | | |
|---|---|---|---|
| JP | 2003-118591 A | 4/2003 | |
| WO | 03/020571 A1 | 3/2003 | |
| WO | WO-03020571 A1 * | 3/2003 | ............. B62D 1/181 |

\* cited by examiner

STEERING APPARATUS AND METHOD FOR CONTROLLING STEERING APPARATUS

INCORPORATION BY REFERENCE

The disclosure of Japanese Patent Application No. 2018-183820 filed on Sep. 28, 2018 including the specification, drawings and abstract is incorporated herein by reference in its entirety.

BACKGROUND

1. Technical Field

The disclosure relates to a steering apparatus used for steering a vehicle and a method for controlling a steering apparatus.

2. Description of Related Art

There is a known autonomous driving technology in which a vehicle autonomously travels along a route to a destination. In autonomous driving of level 3 or higher defined by the National Highway Traffic Safety Administration (NHTSA), a system performs all the driving operations such as acceleration/deceleration, steering and braking of the vehicle, so the driver need not hold the steering wheel by hand for steering the vehicle.

Therefore, a steering apparatus has been proposed that stores the steering wheel at a position near the dashboard by moving the steering wheel toward the front of the vehicle at the time of autonomous driving (see Japanese Unexamined Patent Application Publication No. 2003-118591 (JP 2003-118591 A), for example). By storing the steering wheel, a large space can be secured between the driver and the dashboard, which can enhance the driver's comfort.

SUMMARY

However, in the above-described steering apparatus, the steering wheel may interfere with the body of the driver during storing operation of the steering wheel.

The disclosure provides a steering apparatus and a method for controlling a steering apparatus that can restrain the steering wheel from interfering with the body of the driver during the storing operation of the steering wheel.

A first aspect of the disclosure relates to a steering apparatus used for steering a vehicle. The steering apparatus includes a steering wheel configured to rotate about a first rotation axis, a folding mechanism configured to rotate the steering wheel about a second rotation axis crossing the first rotation axis, so as to fold the steering wheel along the first rotation axis, a moving mechanism configured to move the steering wheel between a protruding position in which the steering wheel protrudes from a dashboard of the vehicle and a stored position that is closer to the dashboard than the protruding position, and an electronic control unit configured to drive the folding mechanism and the moving mechanism. When the folded steering wheel is moved from the protruding position to the stored position, the electronic control unit drives, in advance, a drive member mounted on the vehicle so that the steering wheel is retracted relative to a body of a driver.

A second aspect of the disclosure relates to a method for controlling a steering apparatus used for steering a vehicle. The vehicle includes a drive member, the steering apparatus includes a steering wheel, a folding mechanism, a moving mechanism, and an electronic control unit. The steering wheel is configured to rotate about a first rotation axis. The folding mechanism is configured to rotate the steering wheel about a second rotation axis crossing the first rotation axis so as to fold the steering wheel along the first rotation axis. The moving mechanism is configured to move the steering wheel between a protruding position in which the steering wheel protrudes from a dashboard of the vehicle and a stored position that is closer to the dashboard than the protruding position. The electronic control unit is configured to drive the folding mechanism and the moving mechanism. The method includes: moving, by the electronic control unit, the folded steering wheel from the protruding position to the stored position; and when moving the steering wheel from the protruding position to the stored position, driving, by the electronic control unit, in advance, the drive member mounted on the vehicle so that the steering wheel is retracted relative to a body of a driver.

With the steering apparatus and the method for controlling a steering apparatus according to the above aspects, it is possible to restrain the steering wheel from interfering with the body of the driver during the storing operation of the steering wheel.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of a steering apparatus according to the disclosure will be described below with reference to the drawings. Note that all the embodiments described below show general or specific examples. Numerical values, shapes, materials, components, arrangement positions and connection forms of components, steps, order of steps, and the like shown in the following embodiments are merely examples, and are not intended to limit the disclosure. Further, among the components in the following embodiments, components not described in the independent claims indicating the highest concept are described as optional components.

The drawings are schematic, in which emphasis, omission, and ratio adjustment are made as appropriate to illustrate the disclosure, and may contain shapes, positional relationships, and ratios that are different from those of the actual steering apparatus.

First Embodiment

Figure 1:
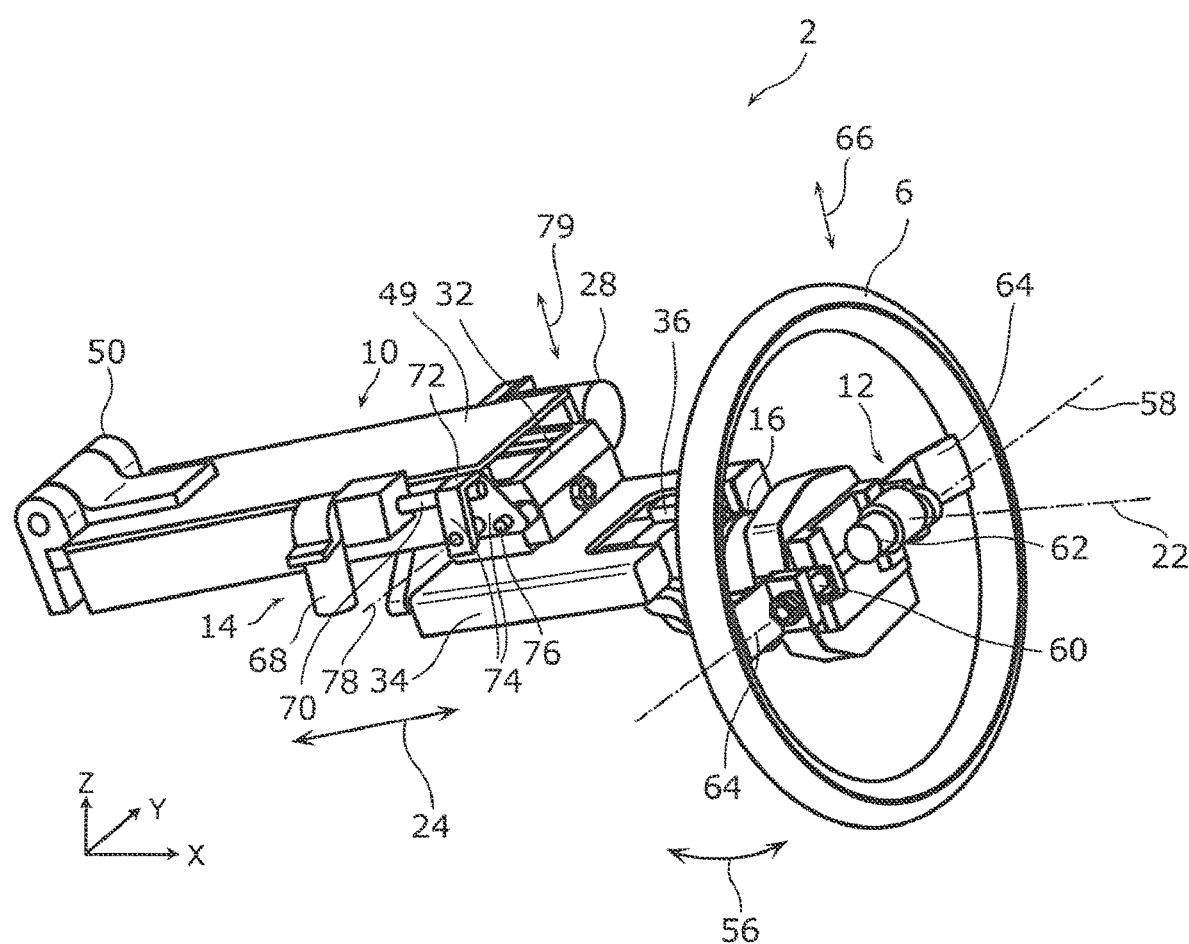
FIG. 1 is a perspective view showing a structure of a steering apparatus according to a first embodiment.
Figure 2:
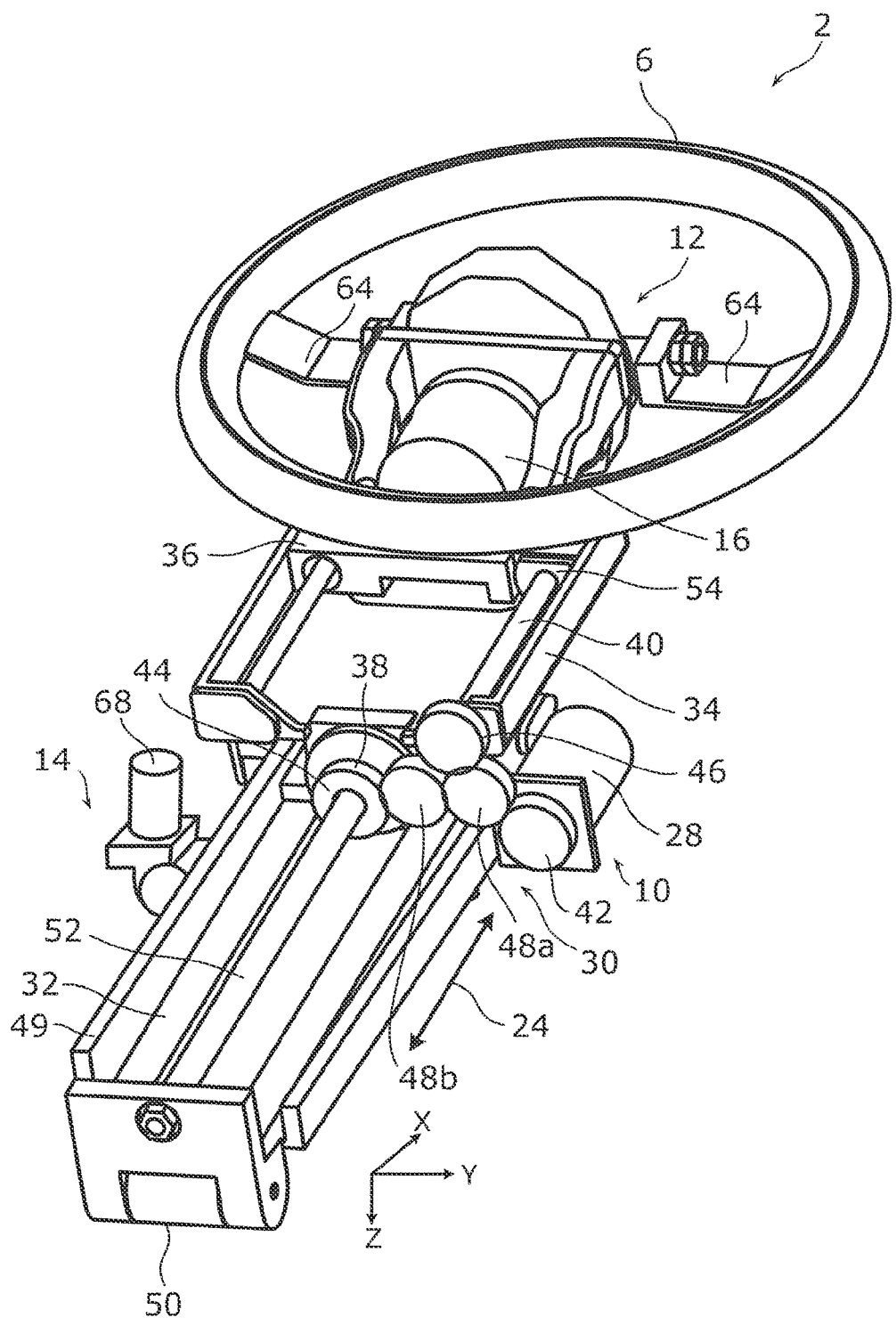
FIG. 2 is a perspective view showing the structure of the steering apparatus according to the first embodiment with a steering wheel folded down.
Figure 3:
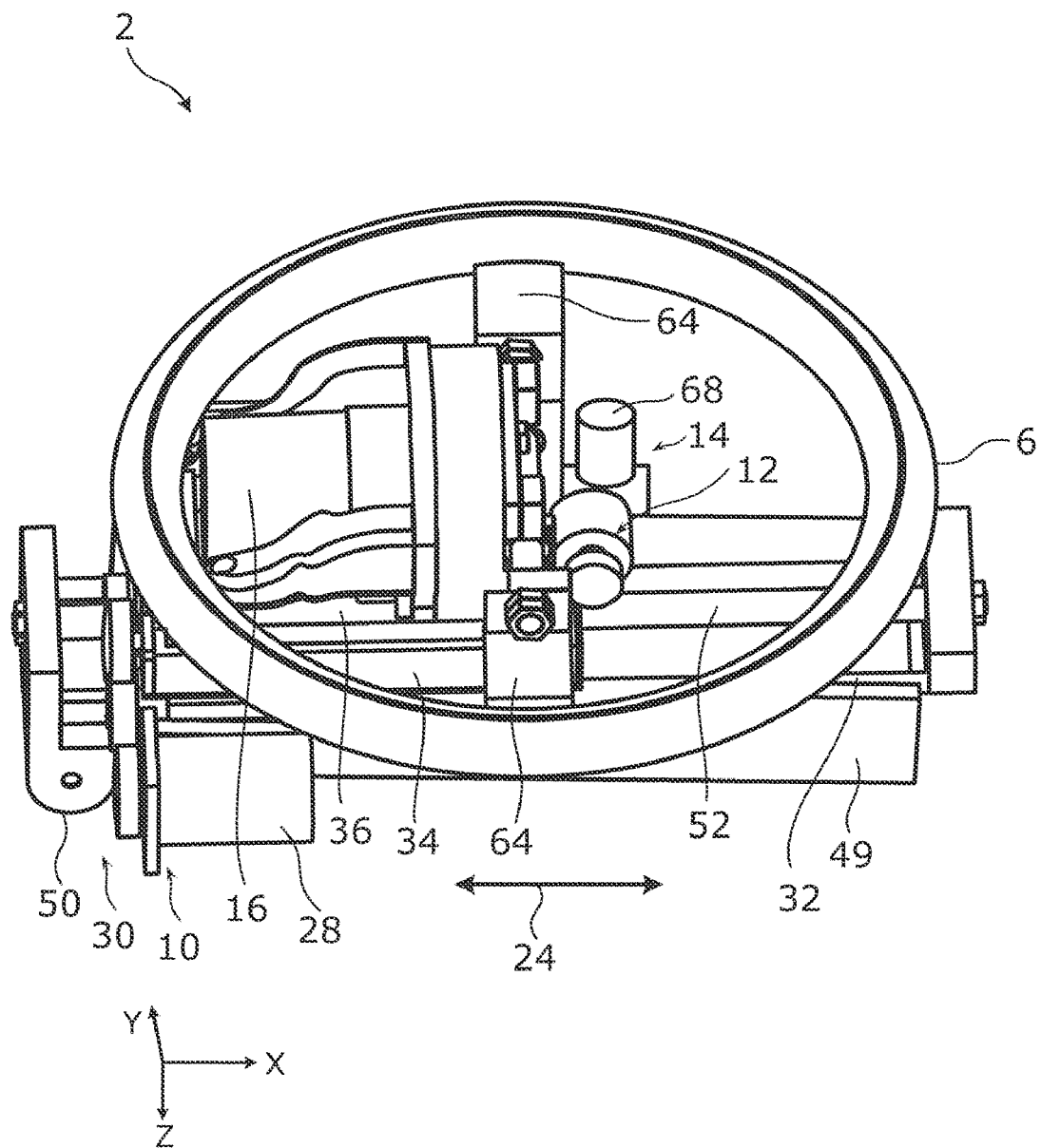
FIG. 3 is a perspective view showing the structure of the steering apparatus according to the first embodiment with the folded steering wheel moved to a stored position.
Figure 4:
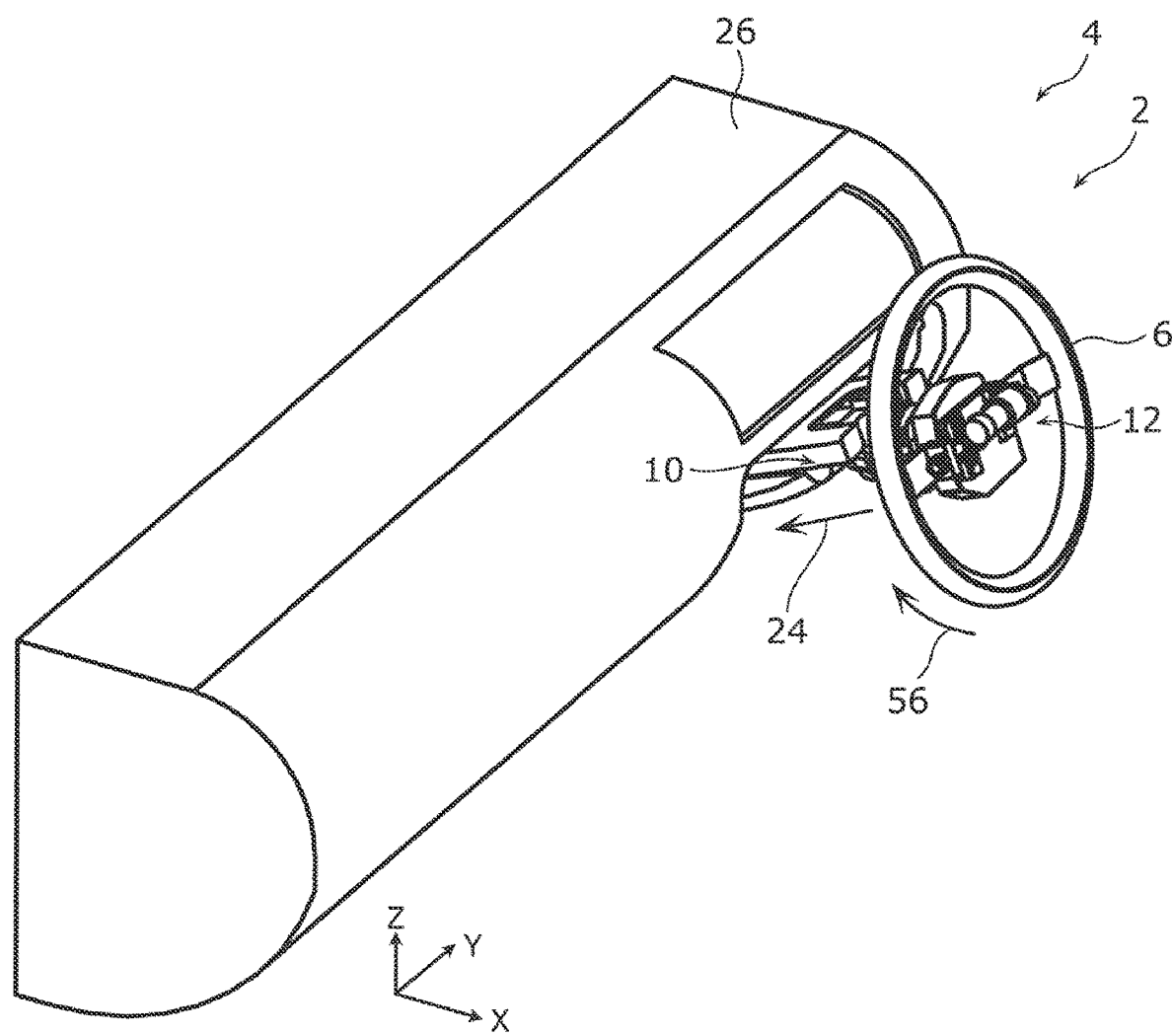
FIG. 4 is a perspective view showing an interior of the vehicle on which the steering apparatus according to the first embodiment is mounted with the steering wheel in a protruding position.
Figure 5:
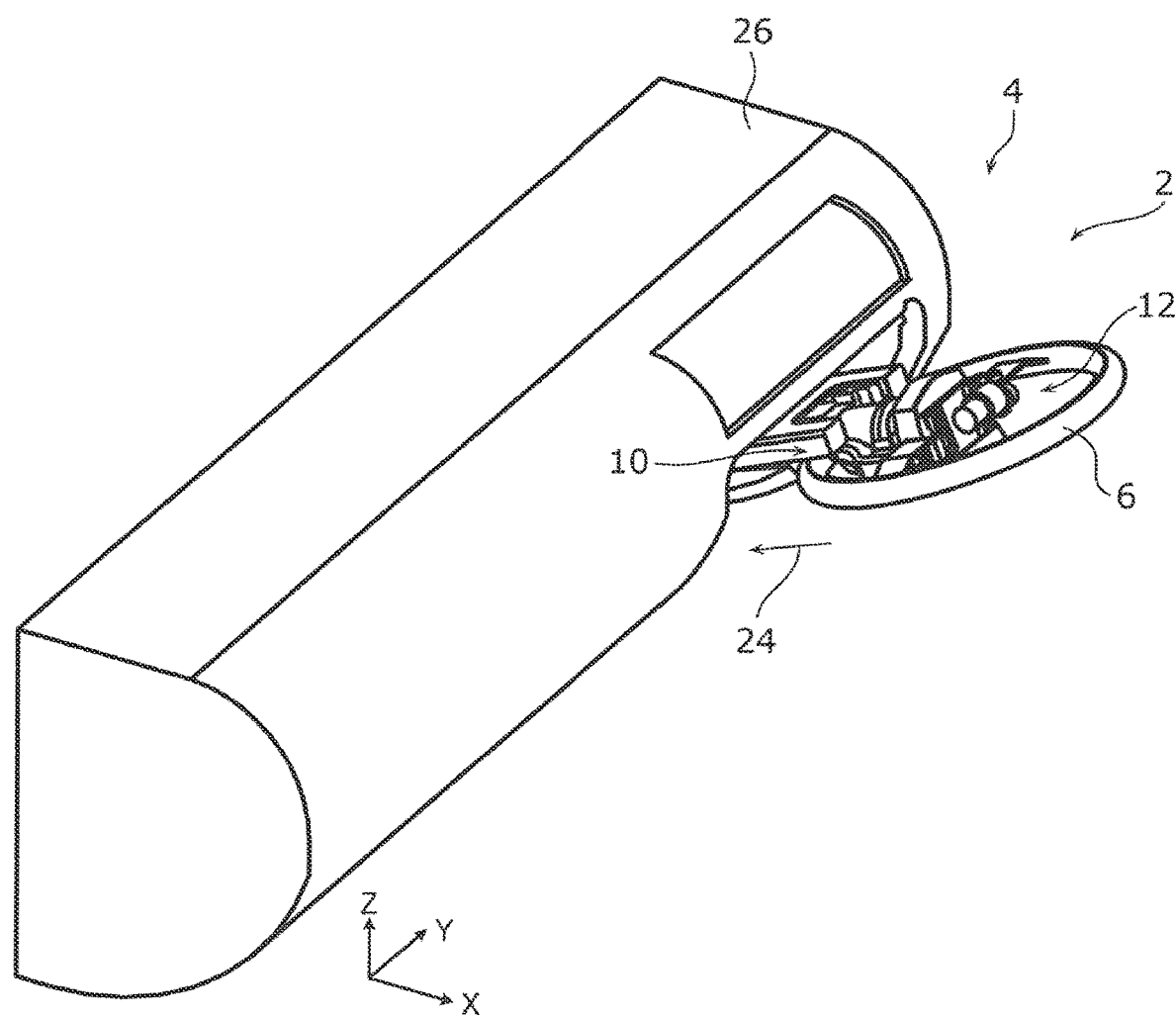
FIG. 5 is a perspective view showing the interior of the vehicle on which the steering apparatus according to the first embodiment is mounted with the steering wheel folded down.
Figure 6:
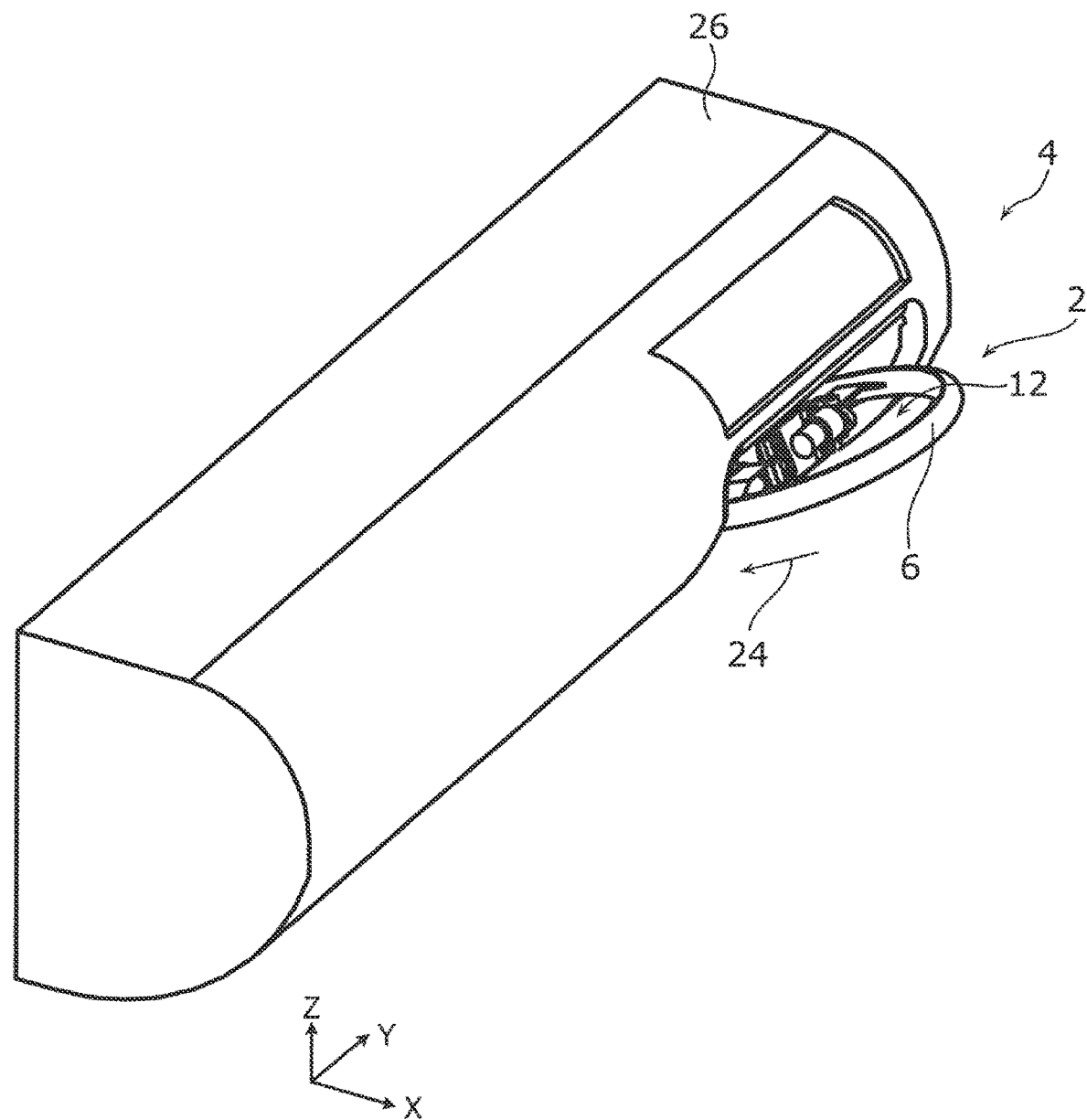
FIG. 6 is a perspective view showing the interior of the vehicle on which the steering apparatus according to the first embodiment is mounted with the folded steering wheel moved to the stored position.

First, a structure of a steering apparatus 2 according to the first embodiment will be described with reference to FIGS. 1 to 6. FIG. 1 is a perspective view showing the structure of the steering apparatus 2 according to the first embodiment. FIG. 2 is a perspective view showing the structure of the steering apparatus 2 according to the first embodiment with a steering wheel 6 folded down. FIG. 3 is a perspective view showing the structure of the steering apparatus 2 according to the first embodiment with the folded steering wheel 6 moved to a stored position. FIG. 4 is a perspective view showing an interior of a vehicle 4 on which the steering apparatus 2 according to the first embodiment is mounted with the steering wheel 6 in a protruding position. FIG. 5 is a perspective view showing the interior of the vehicle 4 on which the steering apparatus 2 according to the first embodiment is mounted with the steering wheel 6 folded down. FIG. 6 is a perspective view showing the interior of the vehicle 4 on which the steering apparatus 2 according to the first embodiment is mounted with the folded steering wheel 6 moved to the stored position.

As shown in FIG. 1, the steering apparatus 2 is mounted on the vehicle 4 (see FIG. 4) and used to steer the vehicle 4. The vehicle 4 is an automobile of which a driving mode can be switched between a manual driving mode and an autonomous driving mode, and is, for example, a passenger car, a bus, a truck, or the like. Note that the vehicle 4 is not limited to automobiles, and may be a construction machine, an agricultural machine, or the like.

As shown in FIGS. 1 to 3, the steering apparatus 2 includes the steering wheel 6, a moving mechanism 10, a folding mechanism 12, a tilt mechanism 14 (an example of a drive member), a reaction force motor 16, and a camera device 18 (see FIG. 7 described later). The steering apparatus 2 is a so-called steer-by-wire steering apparatus, and the steering wheel 6 is not mechanically connected with left and right steered wheels (not shown) of the vehicle 4.

As shown in FIG. 1, the steering wheel 6 is a member operated by a driver 20 (see FIGS. 9A to 9C described later) in the manual driving mode, and has an annular shape, for example. The steering wheel 6 is rotatably supported by a movable member 36 (described later) of the moving mechanism 10 via the folding mechanism 12. The driver 20 can change steered angles of the left and right steered wheels by rotating the steering wheel 6 by hand about a first rotation axis 22. The first rotation axis 22 is a virtual axis extending in a direction indicated by a long dashed short dashed line in FIG. 1 (a front-rear direction of the vehicle 4). The steering wheel 6 rotates within a predetermined rotation range from a left end contact position to a right end contact position with a neutral position (the position shown in FIG. 1) as the center.

As shown in FIG. 1, the moving mechanism 10 is a mechanism for causing the steering wheel 6 to reciprocate between a protruding position (see FIGS. 1, 2, 4 and 5) and a stored position (FIGS. 3 and 6) in a direction indicated by an arrow 24 in FIG. 1, and is, for example, a telescopic mechanism. As shown in FIG. 4, in the protruding position, the steering wheel 6 protrudes from a dashboard 26 of the vehicle 4 toward the driver 20. As shown in FIG. 6, in the stored position, the steering wheel 6 is stored, for example, inside the dashboard 26 of the vehicle 4. That is, the stored position is a position closer to the dashboard 26 than the protruding position. In the stored position, the entire steering wheel 6 may be completely stored inside the dashboard 26, or a part of the steering wheel 6 may be exposed to the outside of the dashboard 26.

Now, the configuration of the moving mechanism 10 will be specifically described. As shown in FIGS. 1 to 3, the moving mechanism 10 includes a drive motor 28, a gear unit 30 (see FIG. 2), a base guide 32, an intermediate guide 34, and the movable member 36.

The drive motor 28 is a drive source for driving the gear unit 30. The drive motor 28 is attached to a side surface of the base guide 32.

The gear unit 30 is a unit for transmitting the driving force of the drive motor 28 to each of a nut 38 (described later) and a feed screw 40 (described later). As shown in FIG. 2, the gear unit 30 includes a first drive gear 42 that rotates integrally with a drive shaft of the drive motor 28, a second drive gear 44 that rotates integrally with the nut 38, and a third drive gear 46 that rotates integrally with the feed screw 40, and a pair of intermediate gears 48a and 48b for transmitting the rotation of the first drive gear 42 to the second drive gear 44 and the third drive gear 46.

The base guide 32 is a member for guiding the intermediate guide 34 to slide. As shown in FIG. 1, the base guide 32 is tiltably supported by a vehicle body mounting bracket 49 via a hinge 50. That is, the base guide 32 can be tilted around the hinge 50 with respect to the vehicle body mounting bracket 49. The vehicle body mounting bracket 49 is fixed to a chassis (not shown) of the vehicle 4. As shown in FIG. 2, a feed screw 52 is fixed to the base guide 32. The nut 38 connected to the second drive gear 44 is screwed to the feed screw 52.

The intermediate guide 34 is a member for guiding the movable member 36 to slide. As shown in FIG. 2, the nut 38 is rotatably supported on the lower surface of the intermediate guide 34. Thus, the intermediate guide 34 is slidably supported by the base guide 32 via the nut 38 and the feed screw 52. When the nut 38 rotates, the nut 38 moves along the feed screw 52 while rotating with respect to the feed screw 52. As a result, the intermediate guide 34 slides relative to the base guide 32 in the direction indicated by the arrow 24 in FIG. 2. Further, the feed screw 40 is rotatably supported on the lower surface of the intermediate guide 34. When the intermediate guide 34 is positioned at an end of the base guide 32 on the driver 20 side, the intermediate guide 34 protrudes toward the driver 20 more than the base guide 32.

The movable member 36 is a member for supporting the steering wheel 6 via the folding mechanism 12. As shown in FIG. 2, a nut 54 is fixed to the lower surface of the movable member 36. The nut 54 is screwed to the feed screw 40 of the intermediate guide 34. Thus, the movable member 36 is slidably supported by the intermediate guide 34 via the nut 54 and the feed screw 40. When the feed screw 40 rotates, the nut 54 moves along the feed screw 40 while rotating with respect to the feed screw 40. As a result, the movable member 36 slides relative to the intermediate guide 34 in the direction indicated by the arrow 24 in FIG. 2.

When the drive motor 28 is driven, the rotation of the drive motor 28 is transmitted to the nut 38 via the first drive gear 42, the pair of intermediate gears 48a, 48b, and the second drive gear 44, and transmitted to the feed screw 40 via the first drive gear 42, the intermediate gear 48a, and the third drive gear 46. Thus, the intermediate guide 34 slides with respect to the base guide 32 simultaneously with the sliding of the movable member 36 with respect to the intermediate guide 34. As a result, the steering wheel 6 reciprocates between the protruding position and the stored position in the direction indicated by the arrow 24 in FIG. 1.

As shown in FIG. 1, the folding mechanism 12 is a mechanism for folding the steering wheel 6. Specifically, the folding mechanism 12 rotates the steering wheel 6 about a second rotation axis 58 orthogonal to the first rotation axis 22 in a direction indicated by an arrow 56 in FIG. 1 between a standing attitude (see FIG. 1) and a folded attitude (see FIGS. 2 and 3). The wording "orthogonal to" represents an example of crossing. As shown in FIG. 1, in the standing attitude, the steering wheel 6 stands with respect to the movable member 36. As shown in FIGS. 2 and 3, in the folded attitude, the steering wheel 6 is folded to extend along an lower end of the movable member 36 (i.e., along the first rotation axis 22). The second rotation axis 58 is a virtual axis extending in the direction indicated by a long dashed short dashed line in FIG. 1.

Here, the configuration of the folding mechanism 12 will be specifically described. As shown in FIGS. 1 to 3, the folding mechanism 12 includes a shaft 60 and a drive motor 62.

The shaft 60 is, for example, a rod-like member disposed to extend in a radial direction of the steering wheel 6. The shaft 60 is supported so as to be rotatable about the second rotation axis 58 with respect to the movable member 36. The steering wheel 6 is supported by the shaft 60 via a pair of connection portions 64. With the steering wheel 6 in the neutral position, the shaft 60 is disposed to extend horizontally.

The drive motor 62 is a drive source for rotating the shaft 60 about the second rotation axis 58 with respect to the movable member 36.

When the shaft 60 rotates about the second rotation axis 58 with respect to the movable member 36, the steering wheel 6 rotates about the second rotation axis 58 in the direction indicated by the arrow 56 in FIG. 1 between the standing attitude and the folded attitude.

As shown in FIG. 1, the tilt mechanism 14 is a mechanism for adjusting the position of the steering wheel 6 in an up-down direction (Z-axis direction). Specifically, the tilt mechanism 14 moves the steering wheel 6 in a direction (up-down direction) indicated by an arrow 66 in FIG. 1. Thus, the tilt angle of the steering wheel 6 can be adjusted.

Here, the configuration of the tilt mechanism 14 will be specifically described. As shown in FIG. 1, the tilt mechanism 14 includes a drive motor 68, a feed screw 70, a nut 72, and a link mechanism 74. The drive motor 68 is a drive source for rotating the feed screw 70, and is attached to a side surface of the vehicle body mounting bracket 49. The feed screw 70 rotates integrally with a drive shaft of the drive motor 68. The nut 72 is screwed to the feed screw 70. The link mechanism 74 is rotatably supported by the nut 72 and is fixed to the end of the base guide 32 on the driver 20 side with a bolt 76.

When the drive motor 68 rotates the feed screw 70, the nut 72 moves along the feed screw 70 while rotating with respect to the feed screw 70. Accordingly, the link mechanism 74 rotates about a third rotation axis 78, and the base guide 32 tilts about the hinge 50 with respect to the vehicle body mounting bracket 49 in a direction indicated by an arrow 79 in FIG. 1. As a result, the steering wheel 6 moves in the direction indicated by the arrow 66 in FIG. 1.

As shown in FIG. 1, the reaction force motor 16 is a motor for generating a steering reaction force, which is the torque in a direction opposite to the rotation direction of the steering wheel 6, when the steering wheel 6 is rotated about the first rotation axis 22. The reaction force motor 16 is a three-phase brushless motor, for example. The reaction force motor 16 is interposed between and connects the movable member 36 of the moving mechanism 10 and the folding mechanism 12. The steering reaction force generated by the reaction force motor 16 gives the driver 20 an appropriate driving sensation based on a road surface reaction force. Further, as described later, when the steering wheel 6 is stored into the dashboard 26, the reaction force motor 16 rotates the steering wheel 6 to the neutral position in advance, and then, locks the rotation of the steering wheel 6 in the neutral position. Furthermore, the reaction force motor 16 is provided with a rotation angle sensor 8 for detecting a rotation angle of the rotor.

Figure 7:
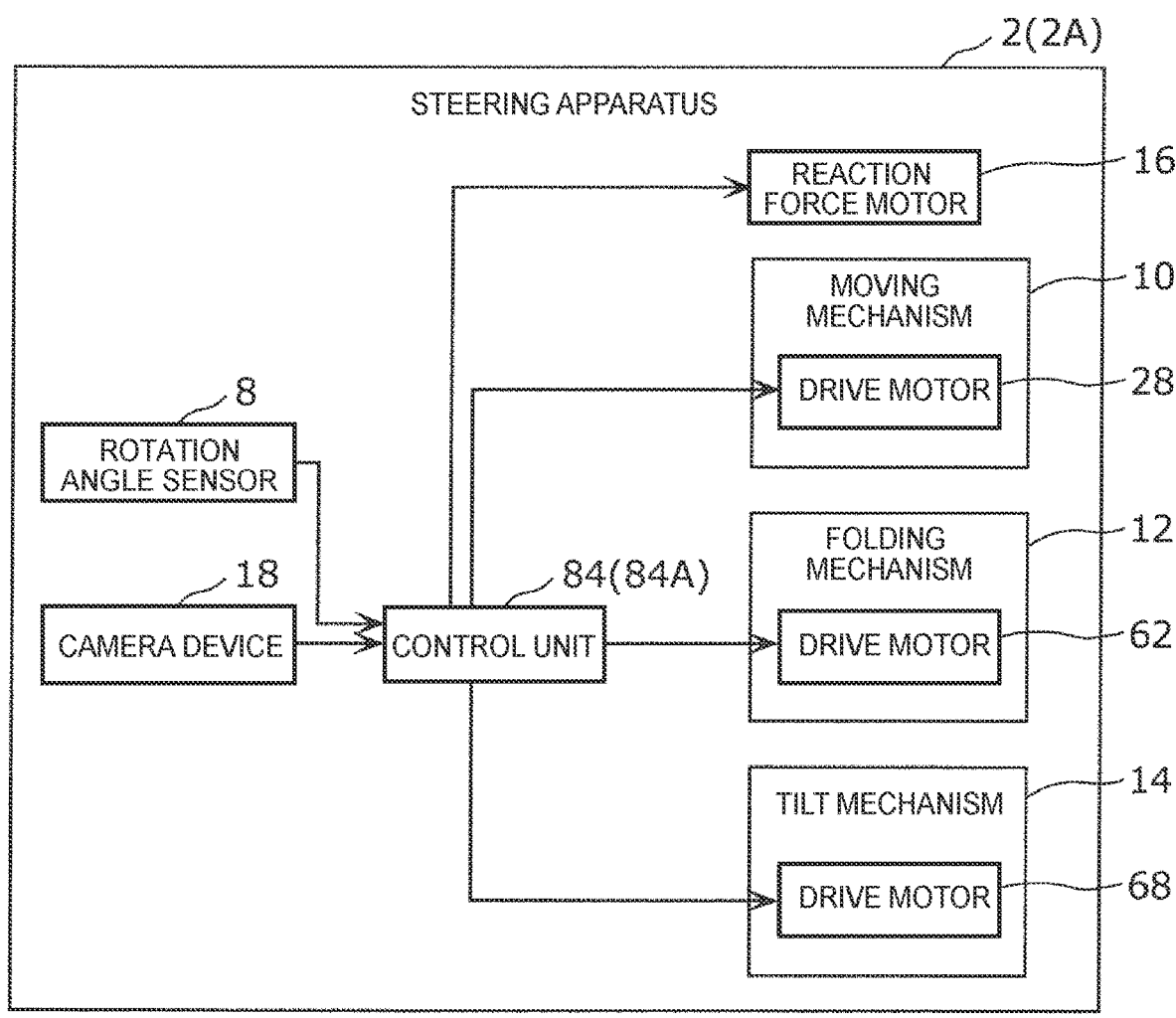
FIG. 7 is a block diagram showing a functional configuration of the steering apparatuses according to the first and second embodiments.

As shown in FIG. 7 described later, the camera device 18 is a device for taking images of the interior of the vehicle 4. The camera device 18 is, for example, a charge-coupled device (CCD) camera. The camera device 18 is disposed, for example, on the ceiling of a cabin of the vehicle 4 and takes images of the driver 20 seated on a driver seat 82 (see FIGS. 9A to 9C described later) and the steering wheel 6.

Next, a functional configuration of the steering apparatus 2 according to the first embodiment will be described with reference to FIG. 7. FIG. 7 is a block diagram showing the functional configuration of the steering apparatus 2 according to the first embodiment.

As shown in FIG. 7, the steering apparatus 2 includes a control unit 84 as a functional configuration. The control unit 84 is an electronic control unit (ECU) that controls the position and the attitude of the steering wheel 6 by driving the drive motor 28 of the moving mechanism 10, the drive motor 62 of the folding mechanism 12, and the drive motor 68 of the tilt mechanism 14.

The control unit 84 determines a distance (an example of positional relationship) between the steering wheel 6 and the body of the driver 20 based on an imaging result (image data) from the camera device 18. Based on the determination result, the control unit 84 decides a method of driving the drive motors 28, 62, 68.

Further, the control unit 84 calculates the steering angle based on the rotation angle of the rotor detected by the rotation angle sensor 8. The steering angle is a rotation angle of the steering wheel 6 from the neutral position. The control unit 84 controls the reaction force motor 16 based on the calculated steering angle. Thus, at the start of the autonomous driving mode, for example, the control unit 84 rotates the steering wheel 6 to the neutral position or locks the rotation of the steering wheel 6 in the neutral position. As a locking mechanism for locking the rotation of the steering wheel 6 in the neutral position, a solenoid lock may be used, for example, which is inserted into a hole provided in a rotating member.

Figure 8:
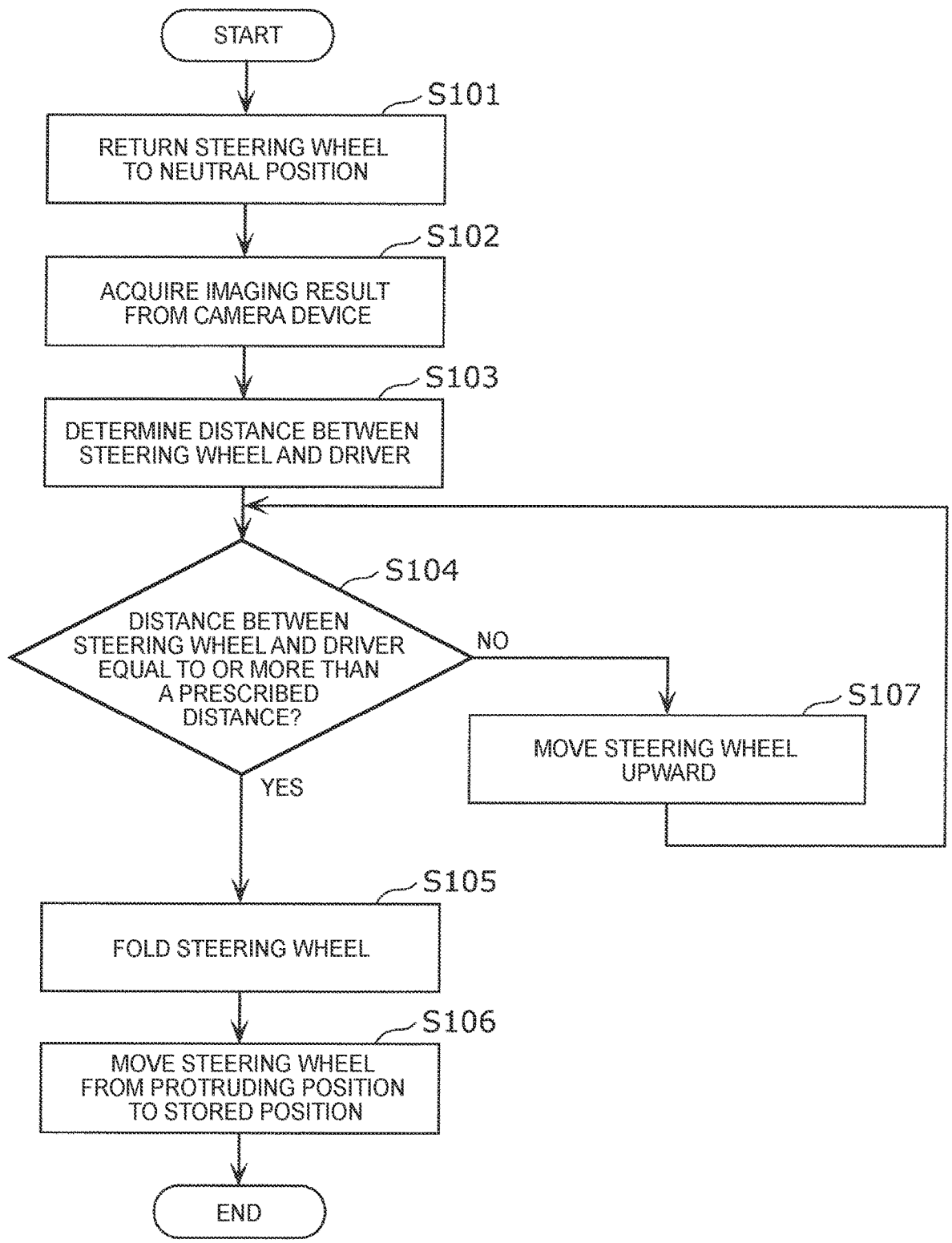
FIG. 8 is a flowchart showing a flow of storing operation of the steering wheel in the steering apparatus according to the first embodiment.
Figure 9A:
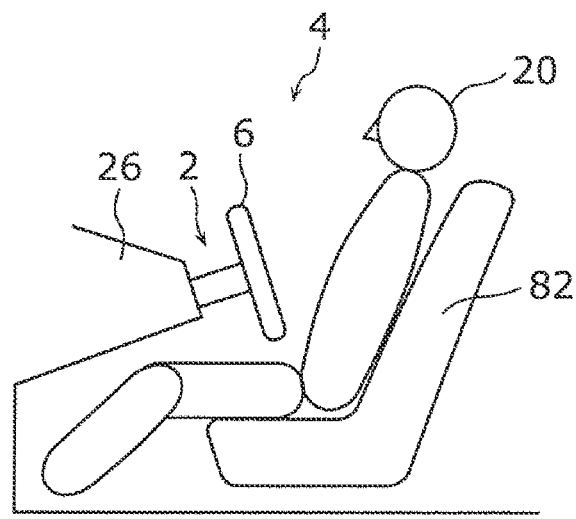
FIG. 9A is a schematic view illustrating the storing operation of the steering wheel in the steering apparatus according to the first embodiment.
Figure 9B:
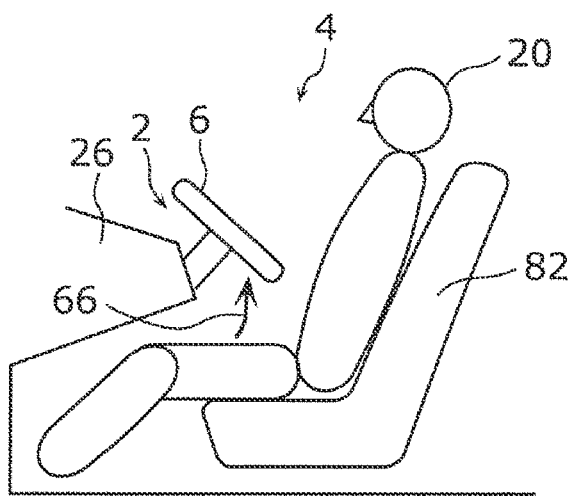
FIG. 9B is a schematic view illustrating the storing operation of the steering wheel in the steering apparatus according to the first embodiment.
Figure 9C:
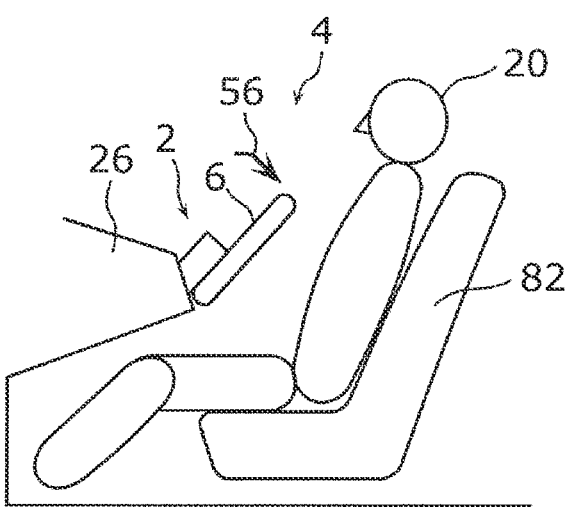
FIG. 9C is a schematic view illustrating the storing operation of the steering wheel in the steering apparatus according to the first embodiment.

Next, storing operation of the steering wheel 6 into the dashboard 26 in the steering apparatus 2 will be described with reference to FIGS. 4 to 6, FIG. 8 and FIGS. 9A to 9C. FIG. 8 is a flowchart showing a flow of the storing operation of the steering wheel 6 in the steering apparatus 2 according to the first embodiment. FIGS. 9A to 9C are schematic views illustrating the storing operation of the steering wheel 6 in the steering apparatus 2 according to the first embodiment.

As shown in FIG. 4, in the manual driving mode, the position and the attitude of the steering wheel 6 are the projecting position and the standing attitude, respectively, and rotation of the steering wheel 6 is not locked. The driver 20 can manually steer the vehicle 4 by rotating the steering wheel 6 by hand about the first rotation axis 22 while being seated on the driver seat 82.

For example, when the driver 20 operates a switch or the like arranged on the dashboard 26, the driving mode is switched from the manual driving mode to the autonomous driving mode. In the autonomous driving mode, the steering wheel 6 is stored into the dashboard 26 as described below.

As shown in FIG. 8, at the start of the autonomous driving mode, the control unit 84 drives the reaction force motor 16 to rotate the steering wheel 6 to the neutral position and to lock the rotation of the steering wheel 6 to the neutral position (S101).

Thereafter, the control unit 84 acquires the imaging result from the camera device 18 (S102), and determines the distance between the steering wheel 6 and the body of the driver 20 based on the acquired imaging result (S103).

When the control unit 84 determines that the distance between the steering wheel 6 and the body of the driver 20 is equal to or more than a prescribed distance (YES in S104), the control unit 84 drives the drive motor 62 of the folding mechanism 12. Thereby, as shown in FIG. 5, the folding mechanism 12 rotates the steering wheel 6 from the standing attitude to the folded attitude to fold the steering wheel 6 (S105). Thereafter, the control unit 84 drives the drive motor 28 of the moving mechanism 10. As a result, as shown in FIG. 6, the moving mechanism 10 moves the folded steering wheel 6 from the protruding position to the stored position (S106).

Although step S106 is executed after step S105 in the present embodiment, steps S105 and S106 may be executed simultaneously. That is, the steering wheel 6 may be moved from the protruding position to the stored position while being folded.

Since a flow of takeout operation of the steering wheel 6 from the stored position to the protruding position is a reverse of the flow of the storing operation described above, the description thereof will be omitted.

In step S104 of FIG. 8, when the control unit 84 determines that the distance between the steering wheel 6 and the body of the driver 20 is less than the prescribed distance (NO in S104), the control unit 84 drives the drive motor 68 of the tilt mechanism 14. As the case where the distance between the steering wheel 6 and the body of the driver 20 is less than the prescribed distance, it is conceivable, for example, that the steering wheel 6 is close to the chest, abdomen, thighs, etc. of the driver 20, as shown in FIG. 9A.

When the control unit 84 drives the drive motor 68 of the tilt mechanism 14, the tilt mechanism 14 moves, as shown in FIG. 9B, the steering wheel 6 upward (in a direction indicated by an arrow 66) (S107). Thus, the steering wheel 6 can be retracted relative to the body of the driver 20 seated on the driver seat 82. Thereafter, the process returns to step S104.

Thereafter, when the control unit 84 determines that the distance between the steering wheel 6 and the body of the driver 20 is equal to or more than the prescribed distance (YES in S104), the control unit 84 drives the drive motor 62 of the folding mechanism 12. Thereby, as shown in FIG. 9C, the folding mechanism 12 rotates the steering wheel 6 from the standing attitude to the folded attitude to fold the steering wheel 6 (S105). At this time, the steering wheel 6 is folded at a position in which the steering wheel 6 is retracted relative to the body of the driver 20. Thus, the steering wheel 6 is restrained from interfering with the body of the driver 20 during the folding operation of the steering wheel 6.

Then, the control unit 84 drives the drive motor 28 of the moving mechanism 10. Thereby, the moving mechanism 10 moves the folded steering wheel 6 from the protruding position to the stored position (S106).

When the driving mode is switched from the autonomous driving mode to the manual driving mode, the control unit 84 may drive the reaction force motor 16 to unlock the rotation of the steering wheel 6, and then rotate the steering wheel 6 from the neutral position to a position of the steering angle corresponding to the steered angle of the steered wheel. This makes it possible to smoothly switch the driving mode from the autonomous driving mode to the manual driving mode.

With the steering apparatus 2 of the present embodiment, the following effects can be obtained. As described above, by retracting the steering wheel 6 relative to the body of the driver 20 at the time of the storing operation of the steering wheel 6, it is possible to restrain the steering wheel 6 from interfering with the body of the driver 20.

Second Embodiment

Next, a functional configuration of a steering apparatus 2A according to a second embodiment will be described, with reference to FIG. 7. FIG. 7 is a block diagram showing the functional configuration of steering apparatus 2A according to the second embodiment. In the following embodiments, the same components as those in the first embodiment are denoted by the same reference characters, and description thereof will be omitted.

In the steering apparatus 2A of the present embodiment, in the autonomous driving mode, when a control unit 84A determines that the distance between the steering wheel 6 and the body of the driver 20 is less than the prescribed distance, the control unit 84A drives the drive motor 28 of the moving mechanism 10 (an example of the drive member), instead of driving the drive motor 68 of the tilt mechanism 14, as shown in FIG. 7.

Figure 10:
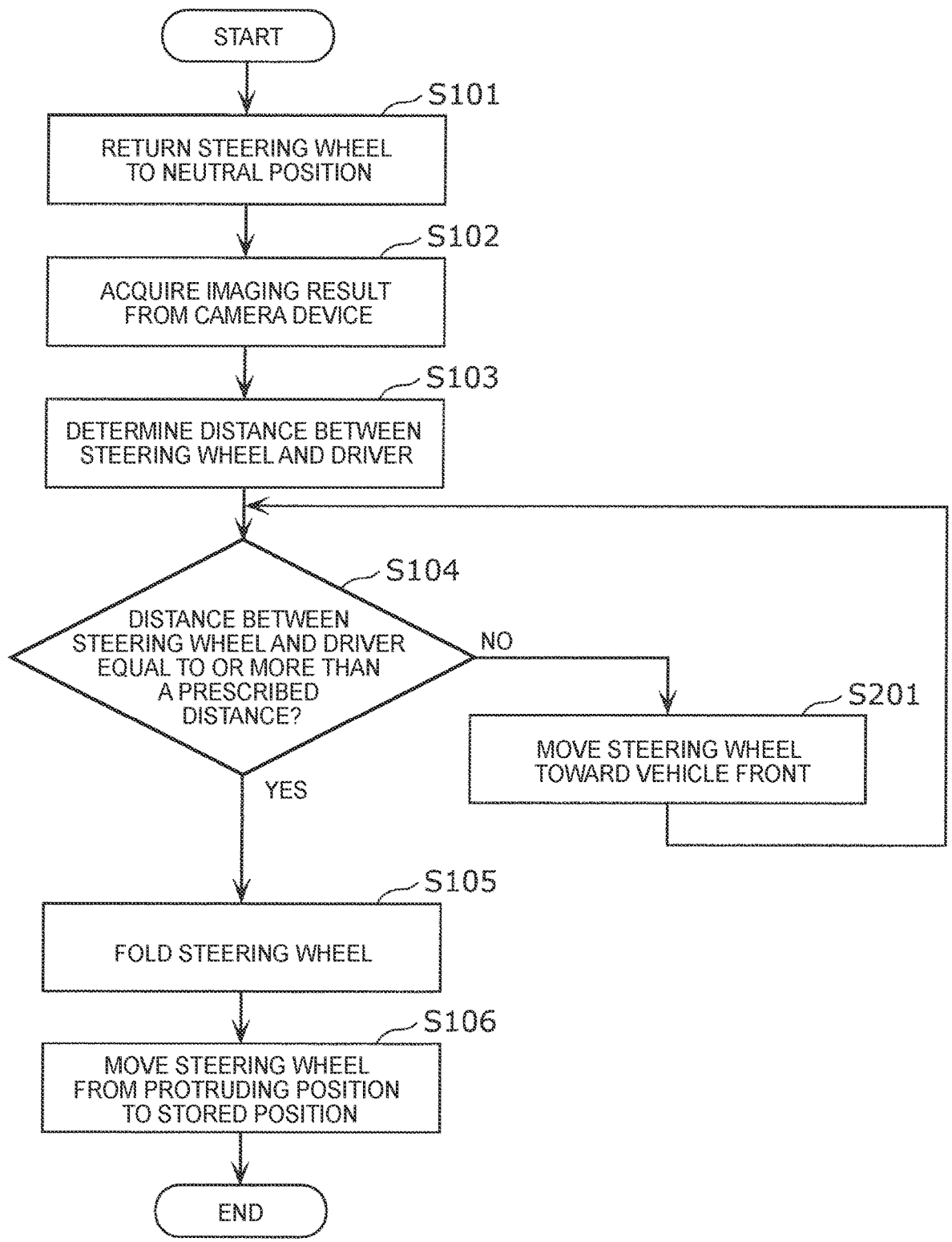
FIG. 10 is a flowchart showing a flow of storing operation of the steering wheel in the steering apparatus according to the second embodiment.
Figure 11A:
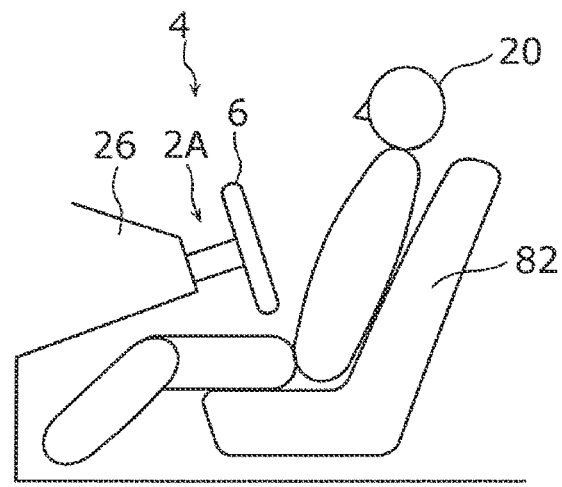
FIG. 11A is a schematic view illustrating the storing operation of the steering wheel in the steering apparatus according to the second embodiment.
Figure 11B:
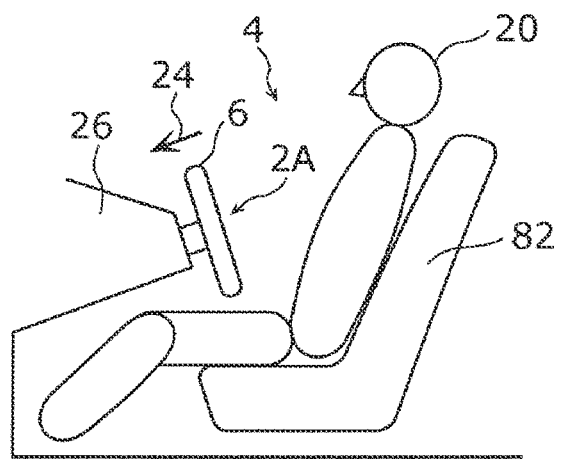
FIG. 11B is a schematic view illustrating the storing operation of the steering wheel in the steering apparatus according to the second embodiment.
Figure 11C:
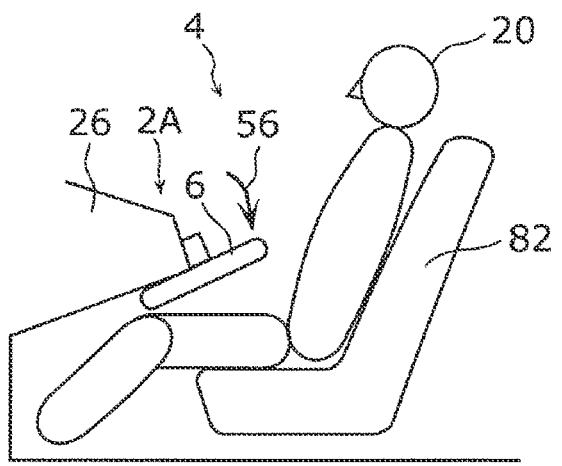
FIG. 11C is a schematic view illustrating the storing operation of the steering wheel in the steering apparatus according to the second embodiment.

Next, storing operation of the steering wheel 6 into the dashboard 26 by the steering apparatus 2A will be described with reference to FIG. 10 and FIGS. 11A to 11C. FIG. 10 is a flowchart showing a flow of the storing operation of the steering wheel 6 in the steering apparatus 2A according to the second embodiment. FIGS. 11A to 11C are schematic views illustrating the storing operation of the steering wheel 6 in the steering apparatus 2A according to the second embodiment. In the flowchart of FIG. 10, the same processes as those in the flowchart of FIG. 8 are assigned with the same step numbers, and description thereof will be omitted.

As shown in FIG. 10, when the autonomous driving mode is started, steps S101 to S104 are executed as in the first embodiment.

When the distance between the steering wheel 6 and the body of the driver 20 is equal to or more than the prescribed distance (YES in S104), steps S105 and S106 are executed as in the first embodiment.

In contrast, when the steering wheel 6 is close to the body of the driver 20 as shown in FIG. 11A, the control unit 84A determines that the distance between the steering wheel 6 and the body of the driver 20 is less than the prescribed distance (NO in S104), and drives the drive motor 28 of the moving mechanism 10. Accordingly, as shown in FIG. 11B, the moving mechanism 10 moves the steering wheel 6 toward the front of the vehicle 4 (in the direction indicated by the arrow 24), that is, in the direction from the protruding position toward the stored position (S201). Thus, the steering wheel 6 can be retracted relative to the body of the driver 20 seated on the driver seat 82.

Then, the process returns to step S104.

Then, when the control unit 84A determines that the distance between the steering wheel 6 and the body of the driver 20 is equal to or more than the prescribed distance (YES in S104), the control unit 84A drives the drive motor 62 of the folding mechanism 12. Thereby, as shown in FIG. 11C, the folding mechanism 12 rotates the steering wheel 6 from the standing attitude to the folded attitude to fold the steering wheel 6 (S105). At this time, the steering wheel 6 is folded at a position in which the steering wheel is retracted relative to the body of the driver 20. Thus, the steering wheel 6 is restrained from interfering with the body of the driver 20 during the folding operation of the steering wheel 6.

Thereafter, the control unit 84A drives the drive motor 28 of the moving mechanism 10. Accordingly, the moving mechanism 10 moves the folded steering wheel 6 from the protruding position to the stored position (S106).

Thus, also with the steering apparatus 2A of the present embodiment, the same effects as those of the first embodiment can be obtained.

In the present embodiment, the moving mechanism 10 moves the steering wheel 6 toward the front of the vehicle 4 in step S201. However, the moving mechanism 10 may move the steering wheel 6 toward the rear of the vehicle 4, that is, in the direction from the stored position toward the protruding position.

Third Embodiment

Figure 12:
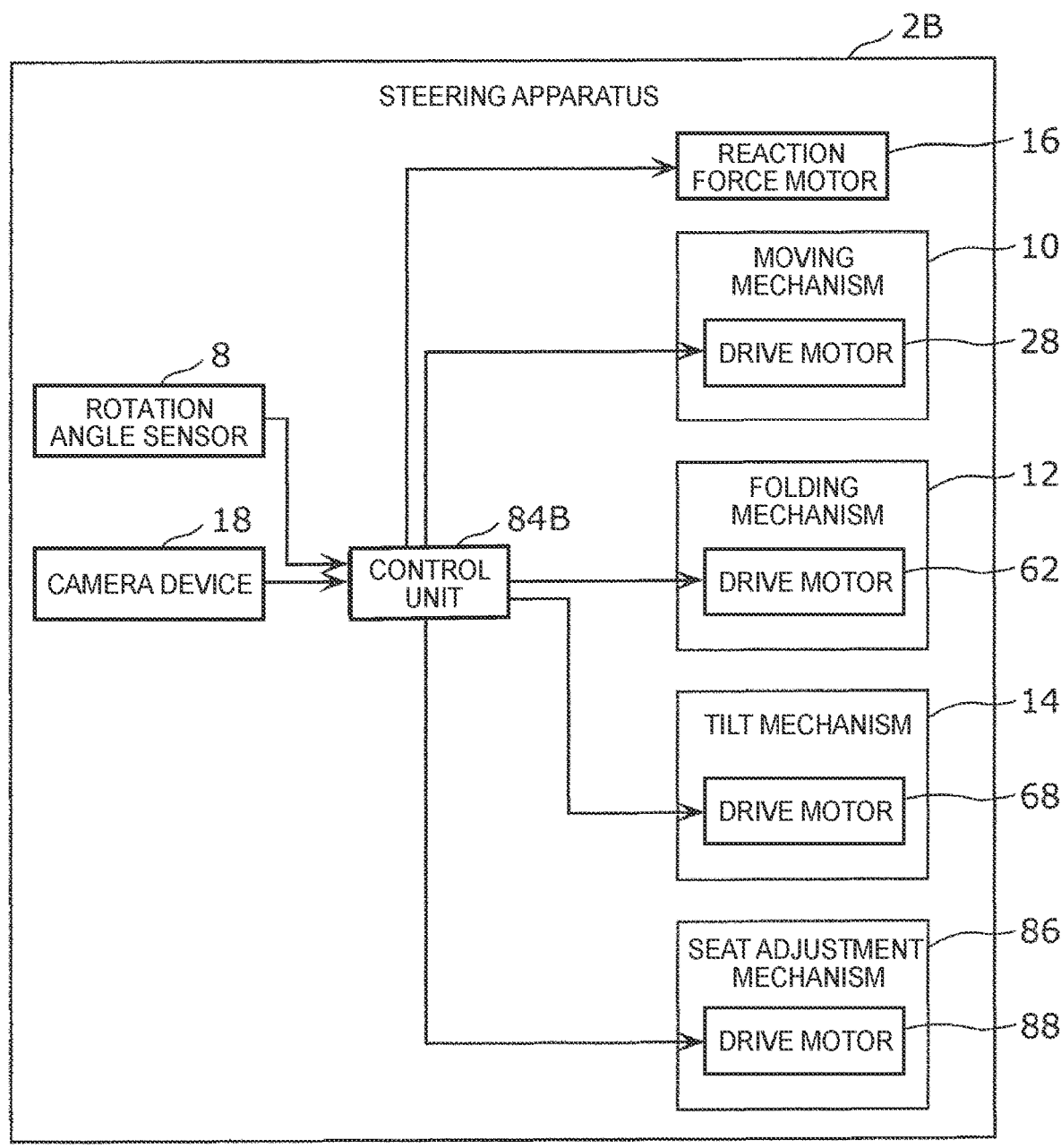
FIG. 12 is a block diagram showing a functional configuration of a steering apparatus according to a third embodiment.

Next, a functional configuration of a steering apparatus 2B according to a third embodiment will be described with reference to FIG. 12. FIG. 12 is a block diagram showing the functional configuration of the steering apparatus 2B according to the third embodiment.

As shown in FIG. 12, the steering apparatus 2B of the present embodiment includes a seat adjustment mechanism 86 (an example of the drive member). The seat adjustment mechanism 86 is a mechanism for adjusting the position of the driver seat 82 in the front-rear direction and the up-down direction. The seat adjustment mechanism 86 includes a slide mechanism (not shown) for moving the driver seat 82 in the front-rear direction, a lifter mechanism (not shown) for moving the driver seat 82 in the up-down direction, and a drive motor 88 for driving the slide mechanism and the lifter mechanism.

A control unit 84B drives the drive motor 88 of the seat adjustment mechanism 86 to adjust the position of the driver seat 82 in the front-rear direction and the up-down direction.

Figure 13:
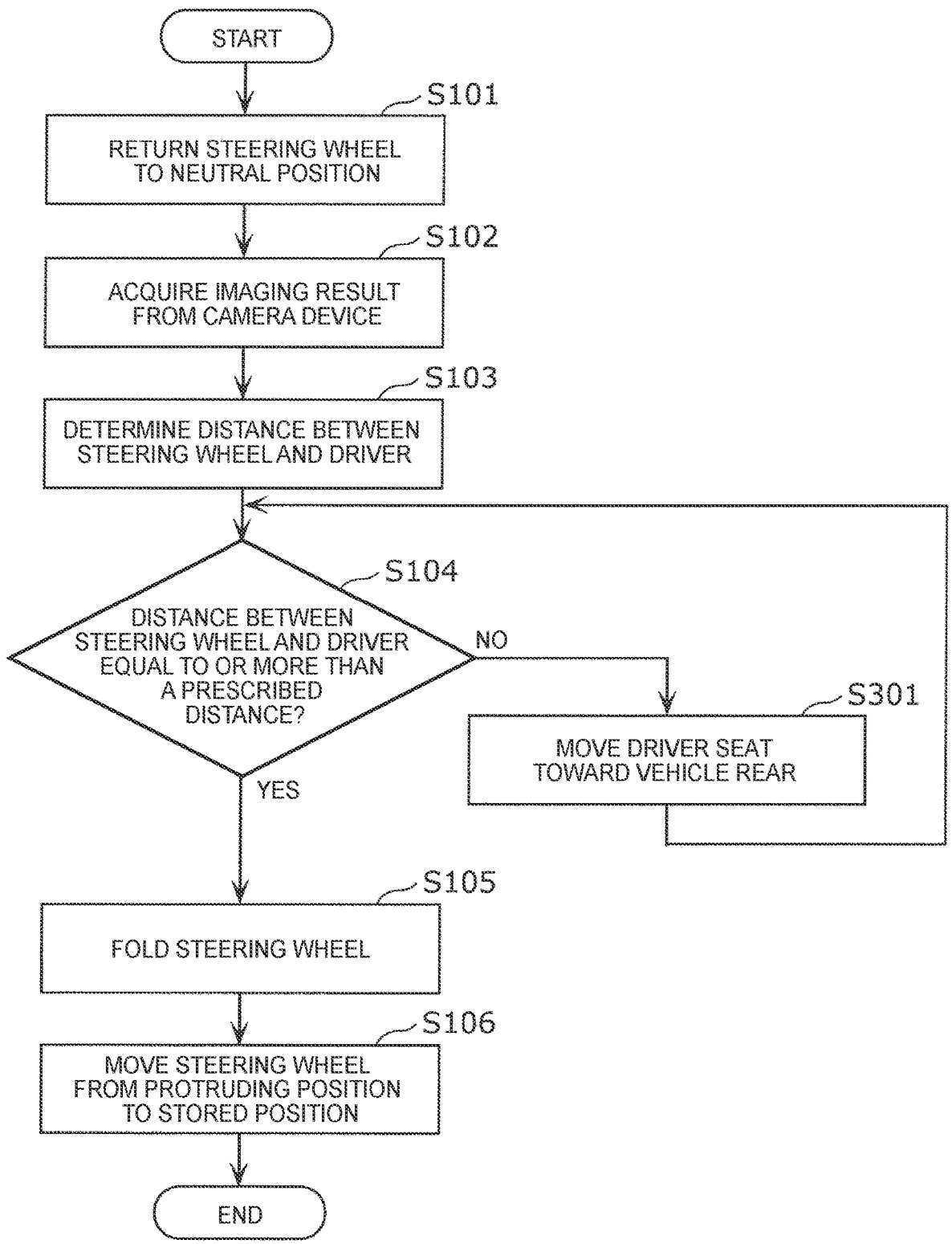
FIG. 13 is a flowchart showing a flow of storing operation of the steering wheel in the steering apparatus according to the third embodiment.
Figure 14A:
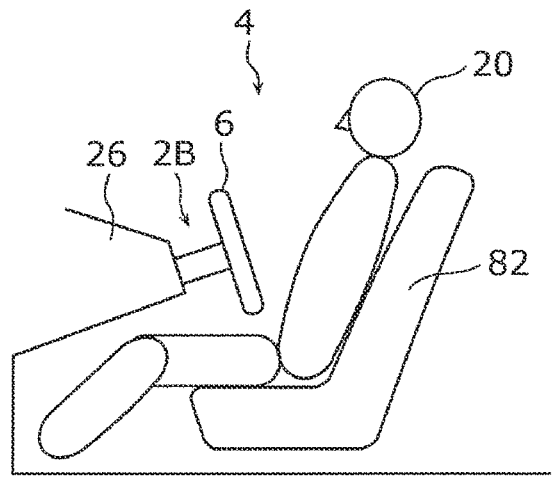
FIG. 14A is a schematic view illustrating the storing operation of the steering wheel in the steering apparatus according to the third embodiment.
Figure 14B:
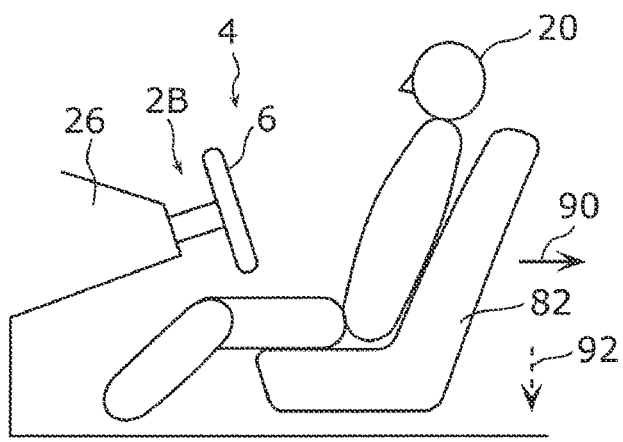
FIG. 14B is a schematic view illustrating the storing operation of the steering wheel in the steering apparatus according to the third embodiment.
Figure 14C:
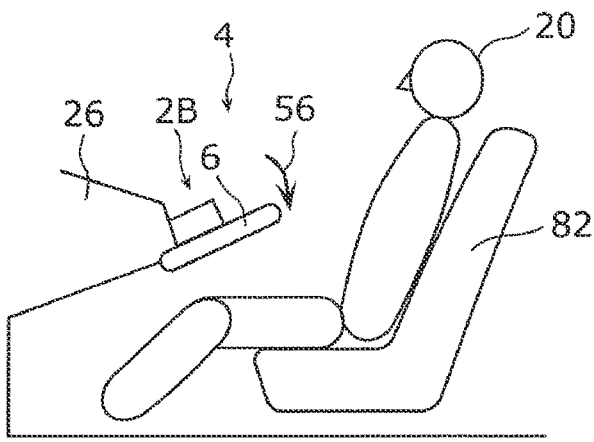
FIG. 14C is a schematic view illustrating the storing operation of the steering wheel in the steering apparatus according to the third embodiment.

Next, with reference to FIG. 13 and FIGS. 14A to 14C, storing operation of the steering wheel 6 into the dashboard 26 in the steering apparatus 2B will be described. FIG. 13 is a flowchart showing a flow of the storing operation of the steering wheel 6 in the steering apparatus 2B according to the third embodiment. FIGS. 14A to 14C are schematic views illustrating the storing operation of the steering wheel 6 in the steering apparatus 2B according to the third embodiment. In the flowchart of FIG. 13, the same processes as those in the flowchart of FIG. 8 are assigned with the same step numbers, and description thereof will be omitted.

As shown in FIG. 13, when the autonomous driving mode is started, steps S101 to S104 are executed as in the first embodiment.

When the distance between the steering wheel 6 and the body of the driver 20 is equal to or more than the prescribed distance (YES in S104), steps S105 and S106 are executed as in the first embodiment.

In contrast, when the steering wheel 6 is close to the body of the driver 20 as shown in FIG. 14A, the control unit 84B determines that the distance between the steering wheel 6 and the body of the driver 20 is less than the prescribed distance (NO in S104), and drives the drive motor 88 of the seat adjustment mechanism 86. Accordingly, as shown in FIG. 14B, the seat adjustment mechanism 86 moves the driver seat 82 toward the rear of the vehicle 4 (in a direction indicated by an arrow 90) (S301). Thus, the steering wheel 6 can be retracted relative to the body of the driver 20 seated on the driver seat 82. Then, the process returns to step S104.

Thereafter, when the control unit 84B determines that the distance between the steering wheel 6 and the body of the driver 20 is equal to or more than the prescribed distance (YES in S104), the control unit 84B drives the drive motor 62 of the folding mechanism 12. Thereby, as shown in FIG. 14C, the folding mechanism 12 rotates the steering wheel 6 from the standing attitude to the folded attitude to fold the steering wheel 6 (S105). At this time, the steering wheel 6 is folded at a position in which the steering wheel 6 is retracted relative to the body of the driver 20. Thus, the steering wheel 6 is restrained from interfering with the body of the driver 20 during the folding operation of the steering wheel 6.

Then, the control unit 84B drives the drive motor 28 of the moving mechanism 10. Accordingly, the moving mechanism 10 moves the folded steering wheel 6 from the protruding position to the stored position (S106).

Thus, also with the steering apparatus 2B of the present embodiment, the same effects as those of the first embodiment can be obtained.

In the present embodiment, the seat adjustment mechanism 86 moves the driver seat 82 toward the rear of the vehicle 4 in step S301. However, the seat adjustment mechanism 86 may move the driver seat 82 downward (in a direction indicated by an arrow 92 in FIG. 14B). Alternatively, the seat adjustment mechanism 86 may move the driver seat 82 downward and toward the rear of the vehicle 4.

Modifications, Etc.

The disclosure is not limited to the above embodiments. For example, other embodiments obtained by combining components described in the specification as desired or by eliminating one or more of the components may be implemented as embodiments of the disclosure. Modifications of the embodiments obtained by making various modifications that may occur to those skilled in the art without departing from the scope of the disclosure, that is, the scope defined by the wording of the claims, are also encompassed in the disclosure.

For example, in each of the above-described embodiments, the control unit 84 (84A, 84B) may determine the positional relationship between the steering wheel 6 and the driver 20 based on the imaging result from the camera device 18 to decide a method of driving the drive member. Specifically, in step S107 (S201, S301), the control unit 84 (84A, 84B) may select, as the drive member, at least one of (a) the drive motor 28 of the moving mechanism 10, (b) the drive motor 62 of the folding mechanism 12, (c) the drive motor 68 of the tilt mechanism 14, and (d) the drive motor 88 of the seat adjustment mechanism 86, in accordance with the positional relationship between the steering wheel 6 and the driver 20, so as to drive the selected drive member. For example, the control unit 84 (84A, 84B) may move the steering wheel 6 upward and move the driver seat 82 toward the rear of the vehicle 4. Thus, the steering wheel 6 can be retracted relative to the body of the driver 20 seated on the driver seat 82 by an optimal method in accordance with the positional relationship between the steering wheel 6 and the driver 20.

Although in each of the above embodiments, the rotation of the steering wheel 6 is locked using the reaction force motor 16, the disclosure is not limited thereto. For example, the rotation of the steering wheel 6 may be locked using a mechanical locking mechanism.

The steering apparatus according to the disclosure is applicable to, for example, an automobile that can switch the driving mode between the manual driving mode and the autonomous driving mode.

What is claimed is:

1. A steering apparatus used for steering a vehicle, the steering apparatus comprising:
   a steering wheel configured to rotate about a first rotation axis;
   a folding mechanism configured to rotate the steering wheel about a second rotation axis crossing the first rotation axis, so as to fold the steering wheel along the first rotation axis;
   a moving mechanism configured to move the steering wheel between a protruding position in which the steering wheel protrudes from a dashboard of the vehicle and a stored position that is closer to the dashboard than the protruding position; and
   an electronic control unit configured to
      determine, at a time when moving the steering wheel between the protruding position and the stored position, whether a positional relationship between the steering wheel and a driver of the vehicle satisfies a predetermined condition,
      when it is determined that the positional relationship does not satisfy the predetermined condition, drive a drive member mounted on the vehicle before driving the folding mechanism and the moving mechanism for moving the steering wheel between the protruding position and the stored position, so that the steering wheel is retracted relative to a body of the driver, and
      thereafter, drive the folding mechanism and the moving mechanism to move the steering wheel between the protruding position and the stored position.

2. The steering apparatus according to claim 1, wherein:
   the drive member includes a tilt mechanism configured to adjust a position of the steering wheel in an up-down direction; and
   the electronic control unit is configured to drive the tilt mechanism to move the steering wheel upward and then drive the folding mechanism to fold the steering wheel.

3. The steering apparatus according to claim 1, wherein:
   the drive member includes the moving mechanism; and
   the electronic control unit is configured to drive the moving mechanism to move the steering wheel in a direction from the protruding position toward the stored position and then drive the folding mechanism to fold the steering wheel.

4. The steering apparatus according to claim 1, wherein:
   the drive member includes the moving mechanism; and
   the electronic control unit is configured to drive the moving mechanism to move the steering wheel in a direction from the stored position toward the protruding position and then drive the folding mechanism to fold the steering wheel.

5. The steering apparatus according to claim 1, wherein:
   the drive member includes a seat adjustment mechanism configured to adjust a position of a driver seat of the vehicle; and
   the electronic control unit is configured to drive the seat adjustment mechanism to move the driver seat toward a rear of the vehicle and then drive the folding mechanism to fold the steering wheel.

6. The steering apparatus according to claim 1, wherein:
   the drive member includes a seat adjustment mechanism configured to adjust a position of a driver seat of the vehicle; and
   the electronic control unit is configured to drive the seat adjustment mechanism to move the driver seat downward and then drive the folding mechanism to fold the steering wheel.

7. The steering apparatus according to claim 2, wherein the electronic control unit is configured to drive the moving mechanism to move the steering wheel to the stored position, after folding the steering wheel.

8. The steering apparatus according to claim 2, further comprising a camera device for taking an image of an interior of the vehicle, wherein
   the electronic control unit is configured to determine the positional relationship between the steering wheel and the driver based on an imaging result from the camera device, so as to decide a method of driving the drive member.

9. A method for controlling a steering apparatus used for steering a vehicle, the vehicle including a drive member, the steering apparatus including a steering wheel, a folding mechanism, a moving mechanism, and an electronic control unit,
- the steering wheel being configured to rotate about a first rotation axis,
- the folding mechanism being configured to rotate the steering wheel about a second rotation axis crossing the first rotation axis so as to fold the steering wheel along the first rotation axis,
- the moving mechanism being configured to move the steering wheel between a protruding position in which the steering wheel protrudes from a dashboard of the vehicle and a stored position that is closer to the dashboard than the protruding position,
- the electronic control unit being configured to drive the folding mechanism and the moving mechanism,
- the method comprising:
  - determining, at a time when moving the steering wheel between the protruding position and the stored position, whether a positional relationship between the steering wheel and a driver of the vehicle satisfies a predetermined condition,
  - when it is determined that the positional relationship does not satisfy the predetermined condition, driving the drive member before driving the folding mechanism and the moving mechanism for moving the steering wheel between the protruding position and the stored position, so that the steering wheel is retracted relative to a body of the driver, and
  - thereafter, driving the folding mechanism and the moving mechanism to move the steering wheel between the protruding position and the stored position.

10. The steering apparatus according to claim 1, wherein the positional relationship includes at least a distance between the steering wheel and the driver and an angular relationship between the steering wheel and the driver.

11. The method according to claim 9, wherein the positional relationship includes at least a distance between the steering wheel and the driver and an angular relationship between the steering wheel and the driver.

* * * * *